UNITED STATES PATENT OFFICE.

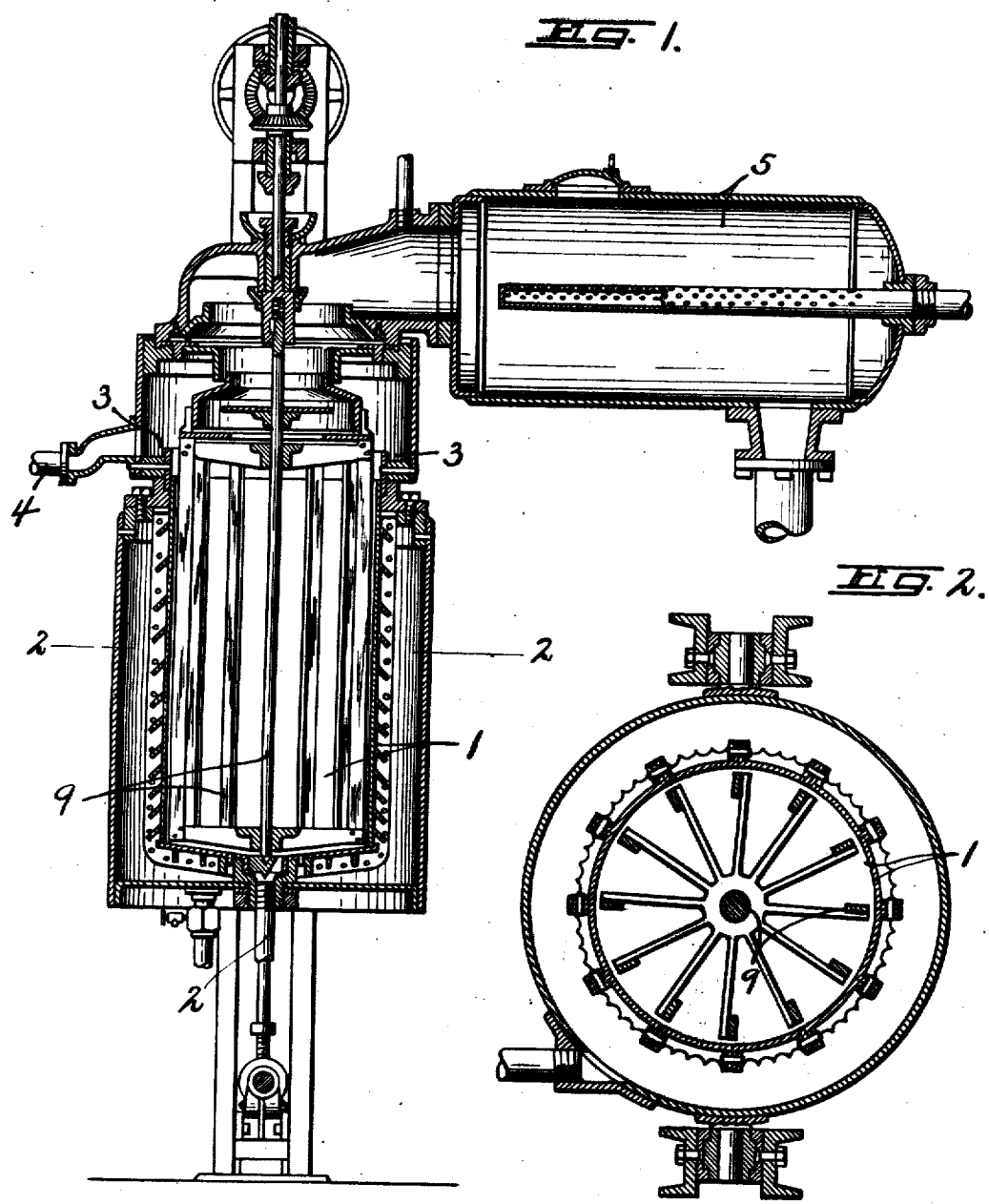

PAUL R. WELCH, OF WESTFIELD, NEW YORK, ASSIGNOR TO THE WELCH GRAPE JUICE COMPANY, OF WESTFIELD, NEW YORK, A CORPORATION OF NEW YORK.

METHOD OF MANUFACTURING FOOD PRODUCTS FROM FRUITS AND VEGETABLES AND THE PRODUCTS.

1,295,943.  Specification of Letters Patent.  Patented Mar. 4, 1919.

Application filed August 31, 1917. Serial No. 189,214.

*To all whom it may concern:*

Be it known that I, PAUL R. WELCH, a citizen of the United States of America, and resident of Westfield, in the county of Chautauqua, in the State of New York, have invented new and useful Improvements in Methods of Manufacturing Food Products from Fruits and Vegetables and the Products of such Method, of which the following, taken in connection with the accompanying drawings, is a full, clear, and exact description.

This invention relates to a new and useful method of manufacturing food products from fruits and vegetables, such as fruit jams, fruit marmalade, fruit butters, fruit pastes, vegetables pastes, catsups, etc., and to the products of such method.

The primary object of the invention, and the feature of perhaps greatest importance, is the securement in such products of jam or marmalade consistency without the usual method of boiling down which is practised in the making of jams, marmalades, pastes, butters, catsups, etc., and results in appreciable loss of color, flavor and aroma.

Another important object is the utilization of the pomace or pulp of the fruit or vegetable in the manufacture of such products.

As illustrative of the broader aspect of my invention, I will proceed to describe it as applied to a specific substance, viz: grapes, for which the process was particularly designed, and to which process certain of the claims are specifically limited, it being understood that the process as utilized in connection with grapes, is adapted to the treatment of all fruits and vegetables in the manufacture of a great variety of products.

The above objects and advantages are effected by the novel method of this application, such method as applied to grapes preferably consisting of the following steps:

First. The reduction of the grapes to a composite mass or pulp. Preferably the stemmed or unstemmed grapes, either heated or unheated, are fed into a continuous pulping machine by means of which the grape juice and grape pulp are separated from the seeds and stems (if unstemmed grapes are used).

The stems contain a material and valuable amount of potash and may be readily separated from the seeds by any suitable method, as a fanning or blowing process which also separates any skins that may be discharged with the seeds.

Under general conditions, portions of the grape skins remain with the seeds and another portion is separated with the pulp and juice, the relative distribution depending largely upon whether the grapes are heated or unheated and upon the size mesh of the screen used in the pulping machine.

Second. The composite mass of grape material comprising the pulp and juice may preferably be sterilized or otherwise preserved, and stored in containers, which may be glass, stone jugs, barrels, and the like, for a period of time sufficient to effect the formation by crystallization of a substantially uniform distribution of definite argol crystals throughout the entire composite body of grape material. The period of time necessary for this purpose may be materially shortened by various methods, such as cold treatment.

Third. The argol crystals may be recovered or separated from the composite body of grape material in any suitable manner, as by a screening machine such as a sugar type centrifugal equipped with proper size mesh screen, the pulp and juice being thrown out and the argol crystals retained within the screen.

Fourth. The grape juice and pulp may then be subjected to pressure preferably in a filter press which will deliver the clear juice for subjection to the next step of the process and discharge the pulp in a cake containing any predetermined amount of moisture, which pomace cake contains a valuable quantity of protein, nitrogen free extract, sugars, carbo-hydrates, etc., all of which are conserved by the method herein.

Fifth. The grape juice is then condensed or concentrated, preferably to a heavy syrup, by any suitable apparatus but preferably this step of the process is effected by a type of centrifugal apparatus such as those shown in the drawings herein, in which—

Figure 1 is a vertical sectional view of a centrifugal concentrating apparatus as shown in an application of Irving S. Merrell, Serial No. 108,383, with the construction of which apparatus I am familiar.

Fig. 2 is a cross section on line 2—2, Fig. 1.

Figure 3:
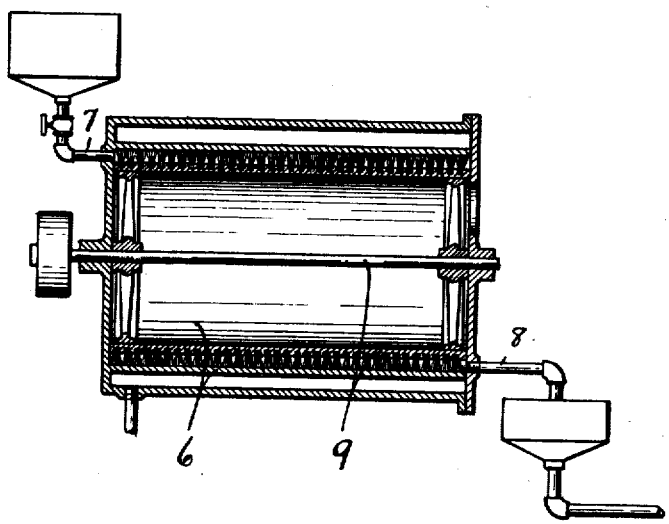
Fig. 3 is a view of a centrifugal open air concentrating apparatus in which the cylindrical container is horizontally disposed instead of vertically disposed as in the apparatus of Fig. 1.

The high vacuum centrifugal evaporating apparatus of Fig. 1 is peculiarly adapted for effecting the concentrating step of the process herein, in that such concentration can be effected without material alteration of the constituents of the grape material subjected to the process.

In the operation of effecting the concentration step, the grape juice may be introduced into the jacketed container —1— through pipe —2— and is centrifugally moved spirally upwardly upon the interior surface of the container in layer form and discharged at the top, as into a trough —3—, and through pipe —4— may be directed into a tank in which the same degree of vacuum should be produced as is produced in the container —1—.

The vapor is separated from the layer of grape juice and moved into the vapor zone within the layer and escapes upwardly into a vapor condensing chamber —5— where it is condensed by suitable water spray to produce the required high vacuum in the container.

The apparatus shown in Fig. 3 embodies a horizontally disposed cylindrical container —6— similar to the container —1— and having a suitable inlet —7— for the liquid and a suitable outlet —8— for the concentrated product. The rotary beater —9— spreads the substance in a substantially uniform layer upon the interior surface of the cylindrical container, whereas, in the apparatus of Fig. 1, the layer tapers from the lower end toward the upper end of the container. The operation of the apparatus in Fig. 3 is effected at high temperatures approximating 212° and at substantially atmospheric pressure.

With this continuous process of concentration, the juice is subjected to the heat (as from steam in the jacket of the container) for a minimum period of time and is at all times maintained in rapid movement. The centrifugal force, as for instance of the rotary beater —9—, constantly tends to arrange the heaviest parts of the juice against the hot wall or surface of the container, but the heat lightens the liquid by producing vapor in it, and thus compels it to retreat from the wall to make place for the non-vaporized heavier portion, thus constantly arranging the light vapor-containing liquid nearer the center of the beater where its vapor may escape most readily and constantly arranging the non-vaporized liquid nearest the heated surface where it receives the greatest heat.

This automatic action of the centrifugal force constantly moving the cooler portion of the liquid into contact with the heated wall and constantly withdrawing the boiling portion with its bubbles eliminates scorching of the material which occurs when bubbles remain in contact with the heating surface, and effects a uniform treatment of the liquid. For these reasons, condensation is effected without chemically altering the solid constituents of the juice.

By the use of an apparatus such as those shown, concentration of the juice may be carried on to any desired degree,—say in a ratio of three or four to one, or until the grape juice becomes a heavy syrup.

Sixth. The concentrated grape juice is then combined with the pomace cake or pulp, preferably with sufficient heating or cooking to effect a proper and adequate combination and preserve the composite material.

By condensing the juice of grapes, which contain considerable sugar—some grapes embodying 22% of sugar—to a very heavy syrup, it is possible to make a grape jam or grape butter, and grape paste, without any added sugar. To the combination of pulp and grape juice other ingredients may be added, such as pectin, either flavored or unflavored, spices, etc. but the addition of such materials is not essential, and I do not desire to limit myself to the same except where specifically set forth in the claims.

The treatment of other fruits and vegetables in carrying out the essential features of the process herein will be readily understood and in operating upon the same it will not be necessary to take into consideration the descriptive matter pertaining to the separation of argol from the composite body of grape juice where such fruits and vegetables to be operated upon do not contain argol or other substances which it is desired to separate from the composite body of material.

By the expression "vegetable matter", as used in certain of claims hereof, I mean fruits or vegetables or the constituents as distinguished from animal substances and matter.

Although I have described a method comprising a specific series of steps and definite methods of effecting each step, all as illustrative of and perhaps preferable in carrying out my invention, I do not desire to limit myself to the same as many changes and substitutions may be made in the details of each and all of the same, all within the scope of my invention as set forth in the appended claims.

What I claim is:—

1. The method of producing a grape product comprising pulping the grapes, separating argol from the pulp, separating the juice from the pulp, concentrating the juice, and combining the pulp and concentrated juice.

2. The method of producing a grape product comprising pulping the grapes, separating argol from the pulp, separating the juice from the pulp, concentrating the juice to a syrup, and combining the pulp and concentrated juice.

3. The method of producing a grape product comprising pulping the grapes, separating argol from the pulp, separating the juice from the pulp, concentrating the juice, combining the pulp and concentrated juice, and heating the combined pulp and concentrated juice.

4. The method of producing a grape product comprising pulping the grapes, separating argol from the pulp, separating the juice from the pulp, concentrating the juice to a syrup, combining the pulp and concentrated juice, and heating the combined pulp and concentrated juice.

5. The method of producing a grape product comprising pulping the grapes, separating argol from the pulp, separating the juice from the pulp, concentrating the juice and combining the pulp, the concentrated juice, and pectin.

6. The method of producing a grape product comprising pulping the grapes, separating argol from the pulp, separating the juice from the pulp, concentrating the juice to a syrup, and combining the pulp, the concentrated juice, and pectin.

7. The method of producing a grape product comprising pulping the grapes, separating argol from the pulp, separating the juice from the pulp, concentrating the juice, combining the pulp, the concentrated juice, and pectin, and heating the combined pulp, concentrated juice and pectin.

8. The method of producing a grape product comprising pulping the grapes, separating argol from the pulp, separating the juice from the pulp, concentrating the juice to a syrup, combining the pulp, the concentrated juice, and pectin, and heating the combined pulp, concentrated juice and pectin.

9. The method of producing a grape product comprising separating the grape seeds from the pulp and juice, permitting argol to form in definite crystals throughout the composite body of pulp and juice, separating the argol from the composite body of pulp and juice, separating the juice from the pulp, concentrating the juice, and combining the concentrated juice and pulp.

10. The method of producing a grape product comprising separating the grape seeds from the pulp and juice, permitting argol to form in definite crystals throughout the composite body of pulp and juice, separating the argol from the composite body of pulp and juice, separating the juice from the pulp, concentrating the juice, combining the concentrated juice and pulp, and heating the combined concentrated juice and pulp.

11. The method of producing a grape product comprising the separation of the grape juice from the grape pulp, and from argol, then concentrating the juice while heated, and then combining the pulp and concentrated juice.

12. The method of producing a grape product comprising the separation of the grape juice from the grape pulp, then concentrating the juice, then combining the pulp and concentrated juice, and then heating the combined pulp and concentrated juice.

13. The method of producing a grape product comprising the separation of the grape juice from the grape pulp, then concentrating the juice, and then combining the pulp, the concentrated juice, and pectin.

14. The method of producing a grape product comprising the separation of the grape juice from the grape pulp, centrifugally shaping the grape juice in a layer upon the interior surface of a container of substantially circular cross section and heated to a temperature sufficient to vaporize liquid constituents of the juice at the pressure maintained in the container, and simultaneously causing the layer to move endwise of the container, permitting the concentrated juice to escape after treatment, and combining the pulp and concentrated juice.

15. The method of producing fruit and vegetable products comprising the separation of the juice from the pulp, then concentrating the juice, then combining the pulp and concentrated juice, and then heating the combined pulp and concentrated juice.

16. The method of producing fruit and vegetable products comprising the separation of the juice from the pulp, then concentrating the juice, and then combining the pulp, the concentrated juice, and pectin.

17. The method of producing fruit and vegetable products comprising the separation of the juice from the pulp, then concentrating the juice, then combining the pulp, the concentrated juice, and pectin, and then heating the combined pulp, concentrated juice, and pectin.

18. The method of producing fruit and vegetable products comprising the separation of the juice from the pulp, centrifugally shaping the juice in a layer upon the interior surface of a container heated to a temperature sufficient to vaporize liquid constituents of the material treated at the pressure maintained in the container and simultaneously moving the juice endwise of the container, permitting the concentrated juice to escape from the container, and combining the concentrated juice and the pulp.

19. The method of producing fruit and vegetable products comprising the separation of the juice from the pulp, centrifugally shaping the juice in a layer upon the interior surface of a container of substantially circular cross section and heated to a temperature sufficient to vaporize liquid constituents of the juice under the high vacuum maintained in the container, continuously discharging the concentrated juice from the container, and combining the concentrated juice and pulp.

20. A grape product of marmalade consistency composed solely of vegetable matters and comprising grape pulp and concentrated grape juice thoroughly combined.

21. A grape product of marmalade consistency composed solely of vegetable matters and comprising grape pulp, concentrated grape juice and pectin thoroughly combined.

In witness whereof I have hereunto set my hand this 24th day of August, 1917.

PAUL R. WELCH.

Witnesses:
W. P. OAKES,
A. LEE SHORT.